United States Patent
Windler et al.

(10) Patent No.: US 11,421,299 B2
(45) Date of Patent: Aug. 23, 2022

(54) DEVICE AND METHOD FOR PRODUCTION OF PURIFIED MAGNESIUM

(71) Applicant: BIOTRONIK AG, Buelach (CH)

(72) Inventors: Markus Windler, Hofstetten (CH); Thomas Eutin, Gallentin (DE)

(73) Assignee: BIOTRONIK AG, Buelach (CH)

( * ) Notice: Subject to any disclaimer, the term of this patent is extended or adjusted under 35 U.S.C. 154(b) by 328 days.

(21) Appl. No.: 16/499,985

(22) PCT Filed: Apr. 10, 2018

(86) PCT No.: PCT/EP2018/059153
§ 371 (c)(1),
(2) Date: Oct. 1, 2019

(87) PCT Pub. No.: WO2018/189175
PCT Pub. Date: Oct. 18, 2018

(65) Prior Publication Data
US 2021/0102271 A1  Apr. 8, 2021

(30) Foreign Application Priority Data

Apr. 11, 2017 (EP) ..................... 17165926

(51) Int. Cl.
*C22B 9/04* (2006.01)
*F27B 5/14* (2006.01)
(Continued)

(52) U.S. Cl.
CPC ............... *C22B 9/04* (2013.01); *C22B 26/22* (2013.01); *F27B 5/14* (2013.01); *F27B 14/04* (2013.01);
(Continued)

(58) Field of Classification Search
CPC .. C22B 26/22; F27B 5/14; F27B 14/04; F27B 14/061; F27B 2014/045
See application file for complete search history.

(56) References Cited

U.S. PATENT DOCUMENTS 5,698,158 A   12/1997  Lam et al.
6,814,779 B2 * 11/2004 Tayama ................... C22B 9/02
                                                                75/414
(Continued)

FOREIGN PATENT DOCUMENTS

WO     20030048398 A1   6/2003

OTHER PUBLICATIONS

Rey, Nathalie; International Search Report for Application No. PCT/EP2018/059153; dated Jun. 25, 2018.

*Primary Examiner* — Scott R Kastler
(74) *Attorney, Agent, or Firm* — Greer, Burns & Crain, Ltd.; Steven P. Fallon

(57) ABSTRACT

A device for producing purified, especially high-purity, magnesium includes a reactor for vacuum distillation that is extended along a longitudinal axis (L). The reactor defines a reactor inner chamber having a heating region for heating magnesium. A crucible forms a crucible inner chamber for receiving purified magnesium vaporized and condensed by the device. A radial projection in the heating region defines a contact surface that extends essentially transverse to the longitudinal axis (L) and forms an essentially sealed connection with an edge of the crucible adjacent to the crucible inner chamber.

16 Claims, 6 Drawing Sheets

(51) Int. Cl.
*C22B 26/22* (2006.01)
*F27B 14/04* (2006.01)
*F27B 14/06* (2006.01)

(52) U.S. Cl.
CPC ....... *F27B 14/061* (2013.01); *F27B 2014/045* (2013.01)

(56) References Cited

U.S. PATENT DOCUMENTS

2015/0128765 A1  5/2015  Wegmann et al.
2021/0102271 A1* 4/2021  Windier .................. C22B 9/04

* cited by examiner

DEVICE AND METHOD FOR PRODUCTION OF PURIFIED MAGNESIUM

PRIORITY CLAIM

This application is a 35 U.S.C. 371 US National Phase and claims priority under 35 U.S.C. § 119, 35 U.S.C. 365(b) and all applicable statutes and treaties from prior PCT Application PCT/EP2018/059153, which was filed Apr. 10, 2018, which application claimed priority from European Application EP 17165926.1, which was filed Apr. 11, 2017.

FIELD OF THE INVENTION

The invention relates to a device and a method for producing purified, especially high-purity, magnesium The present invention concerns a system and a process sequence for thermal purification of magnesium by vacuum distillation.

BACKGROUND

Conventional vacuum distillation of magnesium liquefies and vaporizes magnesium in a reactor in a heating region (hot zone) and condenses the vapor to a high-purity metal melt in a condensation region (cooler zone). After solidifying, this magnesium forms a massive block that may be used, e.g., as raw material for an alloy, for instance in medical technology products.

WO 2013/107644 A1 describes a specialized vacuum distillation device for performing that method. It comprises a reactor having an upper region for receiving the initial substance to be purified (e.g., technically pure magnesium) and a lower region to which a crucible, e.g. made of graphite, is added for receiving the condensed purified magnesium. It is relatively complex to add and remove the crucible to and from the reactor and to clean and maintain the reactor and crucible.

SUMMARY OF THE INVENTION

A preferred embodiment is a device for producing purified, especially high-purity, magnesium. The device includes a reactor for vacuum distillation that is extended along a longitudinal axis. The reactor includes a reactor inner chamber having a heating region for heating magnesium in the heating region. A crucible formed as a pot-shaped container. The crucible includes a crucible inner chamber for receiving purified magnesium that has been vaporized and then condensed. The reactor includes a projection in the heating region that is radially circumferential relative to the longitudinal axis, wherein a contact surface of the projection, which contact surface extends essentially transverse to the longitudinal axis, is configured such that, with an edge of the crucible adjacent to the crucible inner chamber, it forms an essentially sealed connection.

BRIEF DESCRIPTION OF THE DRAWINGS

In the following, the invention is described using figures and examples from which the additional embodiments and advantages may be derived.

DETAILED DESCRIPTION OF THE PREFERRED EMBODIMENTS

Figure 1:
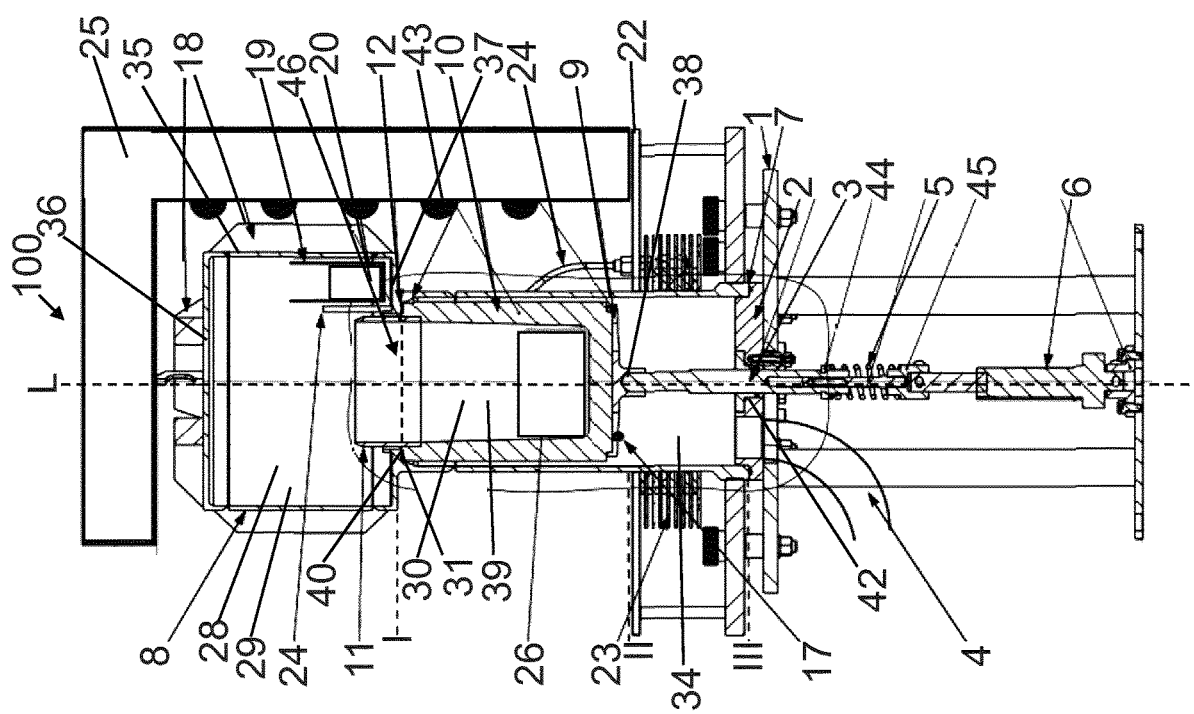
FIG. 1 is a schematic sectional depiction of an inventive device for producing purified magnesium.

In describing preferred embodiments, an essentially sealed connection indicated that the edge of the crucible is an edge or surface axially delimiting the opening of the crucible and that the connection between the contact surface of the projection and the edge of the crucible is not completely vacuum-tight or vapor-tight, but instead a certain gas exchange occurs via the connection despite the edge of the crucible being positioned against the contact surface. One suitable crucible material that permits such an essentially sealed connection at the high temperatures of the distillation process is, e.g., graphite, which has an open porosity of 10% by volume (according to DIN 66133) and a mean pore entrance diameter of 1.8 µm (according to DIN 66133). When using such a material, approximately 2% to 4%, for instance, of the weighed-in weight of the magnesium may escape, as vapor, from the crucible inner chamber via the essentially sealed connection during a distillation. In the context of the application, "essentially sealed" shall therefore be construed to mean that there is a mechanical, gap-free contact between the contact surface of the projection and the edge of the crucible, wherein a force greater than zero acts on the contact surface of the projection and crucible edge such that the two surfaces are pressed together. This force may also be very small; what is critical is that they are pressed together. The "essentially sealed connection" is not in a strict sense vacuum-tight. A very limited gas exchange is allowed. The gas exchange is limited enough to maintain a pressure difference between the inside of the vessel and the atmosphere for a given time period (hours—days).

This has the advantage that, using the connection between the edge of the crucible and the contact surface, the vast majority of the gaseous magnesium is prevented from penetrating into the intermediate space between the crucible and the reactor wall of the condensation region. This reduces in particular the quantity of magnesium that deposits on the wall of the reactor and on the outer wall of the crucible and the crucible may consequently be removed from the reactor in a simpler manner after the method has concluded.

When the device is used properly, the reactor is in particular arranged such that the longitudinal axis runs vertically.

The crucible and the reactor are two separate components that are embodied such that they may be joined simply and reproducibly and together form an inner chamber that comprises the heating region and the condensation region (region in which condensed magnesium forms).

The crucible is preferably arranged below the projection in the heating region of the reactor. The crucible is preferably simply removable from or movable with respect to the heating region of the reactor. In this arrangement, the heating region is above the crucible inner chamber, in which the condensed magnesium collects.

This preferred embodiment has the advantage that the device is significantly simplified. The device essentially comprises two different chambers, the heating region and the condensation region, in which the condensed magnesium collects. The heating region is disposed inside the reactor and the condensation region is disposed inside the crucible. No complicated mechanical devices for deflecting or controlling the vaporized gaseous magnesium, like deflectors, are needed. The aforesaid reactor may be formed, e.g., in a cylinder shape, wherein the aforesaid longitudinal axis, along which the reactor is extended, forms the cylinder axis.

It is understood that the reactor may be made of different suitable materials, for instance from a metal or an alloy, e.g. stainless steel.

As has already be described, the aforesaid projection on the heating region of the reactor is embodied radially circumferential. That is, the projection is embodied continuous in the circumferential direction of the reactor. Moreover, the projection may project e.g. into the reactor inner chamber and/or may be formed, e.g., by a tapering or fold in the reactor wall or using a separate component that is mechanically connected to the reactor inner wall.

To avoid further impurities in the purified magnesium obtained, it is recommended that the aforesaid crucible is made of a material that is chemically inert with respect to magnesium. The crucible is especially made of graphite, preferably high-purity graphite having an ash content of less than 100 ppm, more preferably less than 20 ppm. Such graphite materials may in particular be isostatically pressed and suitable for continuous casting methods. The graphite material may have, e.g., a mean grain size of 10 vim (according to ISO 13320), a density of 1.83 g/cm$^3$ (according to DIN IEC 60413/204); an open porosity of 10% by volume (according to DIN 66133), a mean pore entry diameter of 1.8 μm (according to DIN 66133), a permeability coefficient (at room temperature) of 0.06 cm$^2$/s (according to DIN 51935), a Rockwell hardness $HR_{5/100}$ of 90 (according to DIN IEC 60413/303), a flexural strength of 60 mPa (according to DIN IEC 60413/501), a compression strength of 130 MPa (according. DIN 51910), a thermal expansion (20° C. to 200° C.) of $4.2 \times 10^{-6}$ K$^{-1}$, thermal conductivity (at 20° C.) of 105 Wm$^{-1}$K$^{-1}$ (according to DIN 51908), and an ash content of 20 ppm (according to DIN 51903).

Moreover, the device may have a heating device for heating the reactor inner chamber, in particular the heating region. The heating device may make up a part of the reactor or may be embodied separately from the reactor, e.g. in the form of a hood-type furnace, at least part of which is arranged above the reactor when the reactor is operating.

The device for producing purified magnesium may also have a device for producing a substantial vacuum, e.g. a negative pressure compared to atmospheric pressure, in the reactor inner chamber, such as to establish a minimum pressure in the reactor chamber (e.g. in the range of 100-300 mbar, preferably 50-150 mbar). The reactor inner chamber may be sealed in particular vacuum-tight against the reactor surroundings. The vacuum is needed to protect the magnesium from oxidation and to prevent the distillation process from being slowed by interfering gases.

According to one embodiment, the device has a conically shaped guide for centering the crucible relative to the longitudinal axis during a movement of the crucible along the longitudinal axis, wherein the guide is embodied on the edge of the crucible and/or in a guide region of the reactor that surrounds at least part of an edge of the crucible. The conical guide on the crucible may be embodied on an outer edge of the crucible or on an inner edge of the crucible.

This has the advantage that the crucible is guided into a central position when placed into the reactor inner chamber or when moved in the reactor inner chamber so that the crucible edge is positioned equally against the contact surface of the projection. This improves the essentially sealed connection between the crucible edge and the contact surface and thus prevents the magnesium vapor from entering the reaction inner chamber outside of the crucible in an uncontrolled manner. In addition, the guide permits the crucible and reactor to be placed together in a reproducible manner.

According to one embodiment, the guide region has a conical tapering, in particular iii a region adjacent to the projection, wherein with respect to the longitudinal axis the tapering has a minimum cross-section facing away from the projection and a maximum cross-section facing the projection. The cross-section increases in size toward the heating region. The conical tapering may be formed, e.g., by a tapering of the reactor wall.

According to another embodiment, in addition to the heating region along the longitudinal axis, the reaction inner chamber has a condensation region for condensing the purified magnesium, and the device is designed to move the crucible along the longitudinal axis between a first position and a second position, wherein when the crucible is in the first position the inner chamber of the crucible is in fluidic contact with the reactor inner chamber, and wherein when the crucible is in the second position the edge of the crucible is essentially sealingly positioned against the contact surface of the projection, so that only the heating region is in fluidic contact with the crucible inner chamber, wherein the condensation region is essentially sealed against the heating region and the crucible inner chamber.

In particular the crucible is arranged in the first position and in the second position in the condensation region.

During a preferred method for producing purified magnesium, the heating region is brought to a first temperature and the condensation region is brought to a second temperature, wherein the first temperature is higher than the second temperature. The first temperature is in particular 850° C. to 1100° C., preferably 850° C. to 950° C., and the second temperature is in particular 650° C. to 900° C., preferably 700° C. to 850° C.

When the pressures in the reactor inner chamber are suitable, the result of this is that the magnesium initially melts in the heating region and then transitions from the liquid phase to the gaseous phase and that magnesium vaporized in this manner transitions from the gaseous phase to the liquid phase in the condensation region. Compared to a preferred transition of the vaporized magnesium at lower temperatures of the condensation region directly to the solid phase, this has the advantage that no magnesium crystals form, so that after the further processing of the magnesium there are no inclusions containing magnesium oxide that have a negative effect on the corrosion behavior of the material obtained.

The corresponding temperatures of the heating region and condensation region may be attained, e.g., using separately controlled heating and/or cooling devices that are arranged on the appropriate segments of the reactor. Alternatively, the appropriate temperatures may also be attained, e.g., using an arrangement of a hood-type furnace above the upper part of the reactor in which the heating region is disposed, wherein the lower edge of the hood-type furnace is arranged above the condensation region so that heat from the condensation region can flow outward and the lower second temperature is set in the condensation region.

The device in particular has at least one additional region that, when the longitudinal axis is positioned vertically, is arranged below the crucible, wherein during the preferred method the additional region has a third temperature that is lower than the second temperature of the condensation region, wherein the third temperature is in particular 250° C. to 700° C.

The additional region comprises, e.g. a bottom element of the reactor. The additional region is in particular actively cooled in order to prevent damage to sealing rings, e.g. O-rings, of the bottom element.

According to another embodiment, the wall of the reactor is extended into the additional region.

If the longitudinal axis runs vertically, the heating region of the reactor inner chamber is arranged along the longitudinal axis above the condensation region of the reactor inner chamber.

In particular, the projection is arranged on the transition between the heating region and the condensation region.

Because the edge of the crucible in the second position is positioned essentially sealingly against the contact surface of the projection, the magnesium vapor is advantageously prevented or prohibited from entering the condensation chamber surrounding the crucible and the magnesium is prevented or prohibited from condensing outside of the crucible.

According to another embodiment, the device has a drive device, in particular a hoist motor, that is designed to move the crucible along the longitudinal axis such that the crucible may be moved between the first position and the second position, wherein, when the crucible is in the second position, the drive device is designed to transmit a force onto the crucible so that the crucible is pressed against the projection. This advantageously increases the tightness of the seal between the contact surface and the crucible edge so that less vapor escapes from the crucible inner chamber or from the heating chamber. In this embodiment the crucible is preferably moved against the projection from below.

According to another embodiment, the drive device is embodied for exerting a force onto the crucible so that a surface pressure of 0.1 N/mm$^2$ to 2.0 N/mm$^2$ acts between the edge of the crucible and the contact surface of the projection.

According to another embodiment, the drive device is embodied for exerting a force on the crucible so that a surface pressure of 0.1 N/mm$^2$ to 0.5 N/mm$^2$ acts on the seal.

According to one embodiment, the device has a ram for positioning and/or displacing the crucible.

According to another embodiment, the drive device, especially the hoist motor, is configured to move the crucible, in particular by the ram, via a pressure rod. The drive device is in particular configured, when the crucible is in the second position, to transmit the force onto the crucible via the pressure rod and the ram.

It is possible to bridge longer paths by the pressure rod when moving the crucible between the first and second positions.

According to another embodiment, the pressure rod has a metal or sintered material, ceramic, and/or graphite or is made of a metal or sintered material, ceramic, and/or graphite.

According to another embodiment, the surface of the pressure rod is polished or may be polished.

According to another embodiment, when the device is at operating temperature the material for the pressure rod is embodied such that it does not emit any substances into the surrounding area.

According to another embodiment, when the device is at operating temperature the material of the pressure rod is chemically inert to magnesium. That is, the material of the pressure rod does not react chemically with magnesium at operating temperature.

According to another embodiment, the pressure rod is dimensionally stable up to a temperature of 800° C.

According to another embodiment, the pressure rod is embodied to bridge, along the longitudinal axis, a path of at least 2 mm, in particular at least 1 mm, and a maximum of 10 mm, in particular a maximum of 15 mm.

According to another embodiment, at least one spring device, in particular a compound spring, for transmitting the force from the drive device to the crucible is arranged between the drive device and the crucible in the force transmission direction.

Tolerance-sensitive operation of the drive device may be compensated by the spring device. This has the advantage in particular that the drive device slightly exceeding the necessary force does not result in any deformation and potential damage to the crucible. In addition, the spring device compensates heat-induced deformations in the pressure rod and/or ram so that dimensional stability is assured when there is a thermal load.

According to another embodiment, a pressure rod for transmitting the force is arranged between the drive device and the crucible, and the reaction inner chamber is closed by a bottom element, wherein the bottom element has a through-hole that is embodied for guiding the pressure rod gas-tight through the through-hole.

The bottom element and the reactor have in particular corresponding female and male threads so that the bottom element may be screwed to the reactor.

This has the advantage that the pressure rod may be centered by the guide through the bottom element so that the crucible can be better centered when the crucible edge is pressed against the contact surface of the projection. Thus, in particular, uniform pressure may be attained on the seal arranged between the edge of the crucible and the contact surface of the projection. Moreover, the drive device may be arranged outside of the reactor using the guide of the pressure rod through the through-hole.

According to another embodiment, the through-hole of the bottom element is embodied vacuum-tight against the outside when the pressure rod is guided through the through-hole, e.g. by a sealing ring that circumferentially surrounds the through-hole.

According to another embodiment, the connecting point of the pressure rod to the crucible or to a ram receiving or supporting the crucible is embodied as a joint, i.e., is configured such that a tilt movement of the crucible about the connecting point is possible in a small angle range, in particular up to 20°, in order to provide optimum pressure of the edge of the crucible against the contact surface. This may be attained, e.g., using a clearance between the pressure rod and a cylindrical receiving element on the ram.

Another embodiment provides that the spring device is arranged between the drive device and the pressure rod.

Moreover, the upper region of the bottom element, that is, the region of the bottom element facing the reactor, may be embodied conically so that the bottom element may be guided and positioned precisely.

According to another embodiment, the bottom element has at least one sealing ring that seals radially and/or axially. Such a sealing ring seals the bottom element in particular against the end face of the reactor wall when the bottom element is configured to overlap this end face, that is, when the reactor and bottom element have a cylindrical embodiment, when the diameter of the bottom element exceeds the inner diameter of the reactor.

Suitable sealing rings withstand e.g. temperatures of up to 250° C. Possible materials for this are, e.g., materials such as the fluoroelastomer FKM.

According to another embodiment, the reactor has a vacuum connector for connecting a vacuum pump, so that a vacuum may be produced in the reactor inner chamber by the vacuum pump, and the device has a first thermoelement arranged on the crucible, wherein a measuring line is connected to the first thermoelement, and the measuring line is guided through the vacuum connector.

The vacuum connector is embodied vacuum-tight against the outside when the measuring line is guided through the vacuum connector.

According to another embodiment, the device has a vacuum pump that is fluidically connected to the vacuum connector by means of a vacuum line.

The vacuum pump preferably produces a negative pressure of $10^{-3}$ or less in the reactor inner chamber.

The thermoelement has two leads made of different materials, wherein an electrical voltage dependent on the temperature is positioned between the leads, and wherein the measuring line is electrically connected to the leads such that the voltage applied between the leads can be measured by connecting a voltmeter to the measuring line. Thus, the temperature at the position of the leads may be determined via the measured voltage.

Using the first thermoelement the temperature of the condensation region may advantageously be controlled during the distillation process. Guiding the measuring line through the vacuum connector has the advantage that no other vacuum-tight opening of the reactor is required.

It is particularly important to protect the thermoelement from magnesium vapor, e.g. using a sealing between the crucible edge and contact surface of the projection, because the functional period of the thermoelement may be drastically reduced by condensed magnesium.

According to another embodiment, the device has a pressure sensor for measuring the pressure in the vacuum line.

According to another embodiment, the device has a stop valve for closing connection between the vacuum line and the vacuum pump.

According to another embodiment, the device has an air relief valve for producing a fluidic connection between the vacuum line and the surroundings of the reactor.

The pressure sensor allows an operator to draw conclusions during the method about the pressure in the reactor inner chamber. This is possible because the connection between the crucible inner chamber and the rest of the reactor inner chamber is not completely pressure-tight, but instead permits some exchange of gas. Therefore changes in pressure in the vacuum line, which changes may be measured by the pressure sensor, correspond to changes in the pressure in the heating region and crucible inner chamber.

In this way, the end of the distillation process can be detected through the pressure sensor. To this end, e.g. pressure occurring in the vacuum line can be measured over the entire distillation period. The pressure in the reactor inner chamber, in particular in the chamber formed by heating region and crucible inner chamber, reaches its peak after approximately the first half of the period for the distillation process and drops slightly at the end. When all of the magnesium has been evaporated and condensed in the crucible, the pressure drops to significantly lower levels, e.g., to approx. 35 mbar. This is a signal that the distillation has concluded. When the significant drop in pressure is detected by the pressure sensor, the heating device may be shut off automatically.

According to another embodiment, the vacuum connector is arranged in the bottom element.

According to another embodiment, the device has a cooling device, in particular a set of cooling fins, for removing heat so that a seal of the bottom element may be cooled.

The cooling device is arranged in particular in the additional region of the reactor that comprises the bottom element.

This has the advantage that sealing rings of the bottom element are not destroyed by the temperatures that occur during the method, so that the vacuum tightness of the reactor is assured. According to another embodiment, the device has a cooling device, in particular a set of cooling ribs, for removing heat. The cooling device may be configured to cool a sealing of the bottom element in the additional region of the reactor inner chamber. Alternatively or in addition, the cooling device can cool the crucible in order to cause the purified magnesium to condense. However, it is also provided that the crucible is not brought to the desired temperature by active cooling, but instead using passive heat loss. Moreover, the device may also have a first cooling device and a second cooling device, wherein the first cooling device cools a seal of the bottom element, and the second cooling device is used for cooling the crucible.

In particular a preferred cooling device has a device for forced circulation, e.g. a fan.

According to another embodiment, the device has seal, in particular a flat seal, that is arranged or may be arranged between the edge of the crucible and the contact surface of the projection, wherein in particular the surface facing the edge and/or the surface of the inner circumference of the seal is made of graphite.

The sealing between the combined heating chamber/crucible inner chamber and the condensation chamber is improved by the seal. In addition, the seal prevents crucible and reactor from seizing or joining, and thus permits the crucible to be removed from the reactor again so that the purified magnesium may be removed.

The crucible inner chamber is not sealed completely vacuum-tight or vapor-tight against the rest of the reactor when using a seal between crucible edge and projection, either; instead, a certain gas exchange takes place via the essentially sealing connection, but this gas exchange is lower than without using a seal.

According to another embodiment, the entire seal is made of graphite.

The seal may usefully be temperature-resistant up to 1100° C.

According to another embodiment, the seal has a surface roughness Ra of 0.05 to 0.8 μm.

Since the seal may come into contact with the magnesium vapor during the distillation process, it is also useful when the seal is chemically inert to magnesium.

Further, the seal may optionally have a metal inlay.

One design provides that the seal has a thickness of up to 5 mm along the longitudinal axis and/or a radial sealing width of at least 3 mm.

According to another embodiment, the contact surface of the projection and/or of the edge of the crucible has a convex elevation, in particular a ridge, that is positioned against the seal when the seal is arranged between the edge of the crucible and the contact surface of the projection. Such a convex elevation may be formed, e.g., by a geometric material projection worked into the reactor or crucible, e.g., a semicircular projection.

The convex elevation is in particular extended along the longitudinal axis.

The convex elevation permits a higher surface pressure against the seal between the edge of the crucible and the contact surface of the projection. The seal is thus more loaded locally and the sealing effect is increased so that less vapor escapes from the crucible inner chamber and reactor inner chamber.

According to one embodiment, the inner chamber has a sufficiently large minimum sectional extension, relative to the longitudinal axis, so that the heating chamber of the reactor is accessible from below and the heating chamber may be loaded manually with magnesium before the distillation method is executed.

According to another embodiment, the device has a heating device for heating at least the heating region, so that magnesium made available in the heating region may be vaporized. The heating device is embodied in particular as a hood-type furnace arranged outside of the reactor.

The preferred reactor has in particular at least one placement surface for storing the heating device.

According to another embodiment, the crucible has an axial extension that extends the crucible inner chamber axially beyond the edge of the crucible used for the sealing. The crucible may be molded, e.g., in two parts, wherein the axial extension makes up one of the parts.

The aforesaid extension projects into the heating region when the position of the crucible is essentially sealing. Thus it is possible to prevent a situation in which the entire crucible must be replaced if the extension is contaminated. In these cases, only the extension must be replaced. In addition, due to the axial extension, where necessary a radial sealing between the heating region and the condensation region and between the crucible inner chamber and the condensation region at the projection is possible.

The extension is in particular connected to the crucible by means of a detachable connection.

Such an extension may be inserted into the crucible e.g. via a plug-in connector (for example, a cylindrical or conical plug-in connector).

A second aspect of the invention relates to a method for producing purified magnesium using a device for producing purified magnesium according to the first aspect of the invention, wherein magnesium is made available in the heating region of the reactor inner chamber, the crucible is arranged in the reactor inner chamber, in particular in the condensation region of the reactor inner chamber, a vacuum is produced at least in the heating region and in particular in the condensation region of the reactor inner chamber, the edge of the crucible is brought into essentially sealed contact with the contact surface of the projection, wherein in particular a force is generated on the crucible along the longitudinal axis so that the edge of the crucible is positioned essentially sealed against the contact surface of the projection, and the heating region of the reactor inner chamber is heated so that magnesium is vaporized in the heating region and vaporized purified magnesium is condensed in the crucible.

According to one embodiment of the method, the heating region of the reactor inner chamber is heated to a first temperature, in particular 850° C. to 950° C., and the condensation region of the reactor inner chamber is heated to a second temperature, in particular 700° C. to 850° C., wherein the second temperature is lower than the first temperature.

According to another embodiment of the method, the magnesium is added to the heating region of the reactor inner chamber via the condensation region of the reactor inner chamber.

According to another embodiment of the method, the magnesium is positioned in at least one transportable container in the heating region of the reactor inner chamber. The magnesium is in particular transported into the heating region in the at least one container.

This permits simple loading of the reactor from below and simple elimination of the residues from the distillation process, since these do not occur on the reactor walls, but rather in the containers. The containers may be removed from the reactor after the distillation and cleaned, e.g. mechanically and/or by machine. From time to time, e.g. a stream process may be used for cleaning.

The aforesaid container comprises in particular steel, stainless steel, or graphite.

According to another embodiment, the container has a sealed welded structure.

Moreover, the container may be securely positioned in the reactor manually or with a tool, so that the container has a secure stand in the reactor.

According to another embodiment, in a first sub-step the heating region and the condensation region are heated by\a heating device, in particular by a hood-type furnace positioned above the heating region and the condensation region, wherein at the beginning of a second sub-step the heating device is positioned such that the heating region is further heated, wherein during the second sub-step the heating region the condensation region is connected to the surroundings of the reactor in a heat-conducting manner, so that heat can flow out of the condensation region into the surroundings. In the second sub-step, an equilibrium occurs so that the temperature of the condensation region is lower than the temperature of the heating region.

This may be made possible, e.g., by arranging a hood-type furnace on a first spacer (e.g. a placement surface) during the first sub-step, and lifting the hood-type furnace to a second spacer (e.g. a placement surface) at the beginning of the second sub-step. Alternatively, the hood-type furnace may also be suspended and raised, e.g. on a crane, and positioned appropriately above the reactor.

This results in the advantage that the different temperatures of the heating region and of the condensation region may be realized with only one heating device.

According to another embodiment of the method, a pressure is detected in the vacuum line, wherein, if the pressure drops below a threshold pressure, especially 35 mbar, the heating of the heating region is terminated. In particular the heating of the condensation region is also terminated if the pressure drops.

The pressure in the vacuum line corresponds in particular to the pressure in the space formed by the heating region and crucible inner region. During the vacuum distillation process, the pressure initially rises due to the vaporizing magnesium, reaches a peak after about half the period of the method, and then drops slightly. If all of the magnesium in the crucible inner chamber is condensed, the pressure drops sharply due to the lack of magnesium vapor pressure, especially to about 35 mbar. This drop in pressure may be used as a signal for the end of the process in order to then turn off the heating device.

FIG. 1 is a schematic sectional depiction of a device 100 for producing purified magnesium 26 having a reactor 8 that is extended along a longitudinal axis L. The reactor 8 is positioned on a base 1, wherein a base element 2 of the reactor 8 that closes the bottom of the reactor 8 is screwed to the base 1.

The reactor 8 forms a reactor inner chamber 28 that has a heating region 29 arranged above an first notional sectional line I, a condensation region 30 arranged below the first sectional line I between the first sectional line I and a second sectional line II, and an additional region 34 arranged below the second sectional line II between the second sectional line II and a third sectional line III. The sectional lines I, II, III each run along a transverse plane that runs perpendicular to the longitudinal axis L.

In the embodiment depicted in FIG. 1, the reactor 8 has a cylindrical shape, wherein the heating region 29 in cross-section has a greater diameter than the condensation region 30 and the additional region 34. Other geometries are possible, as well. In the heating region 29 the reactor 8 is closed by a cover 36 to which in particular a lateral surface 35 of the reactor 8. On the lateral surface 35 and cover 36 are ribs 18 for preventing stress-induced deformations, caused by changes in pressure or temperature.

Radially, the heating region 29 has a bottom 37 that is embodied circumferentially in the shape of a ring. The inner circumference of the annular bottom 37 has an opening 46 that is connected to the condensation region 30. As illustrated in FIG. 1, containers 19 for receiving purified magnesium 20 may be positioned on the bottom 37. Optionally, a circumferential edge may be arranged on the inner circumference of the bottom 37 to prevent the containers 19 from falling through the opening 46, e.g., when the reactor 8 is being loaded. A second thermoelement 24 for determining the temperature of the heating region 29 is positioned in the heating region 29 of the reactor inner chamber 28.

Figure 3:
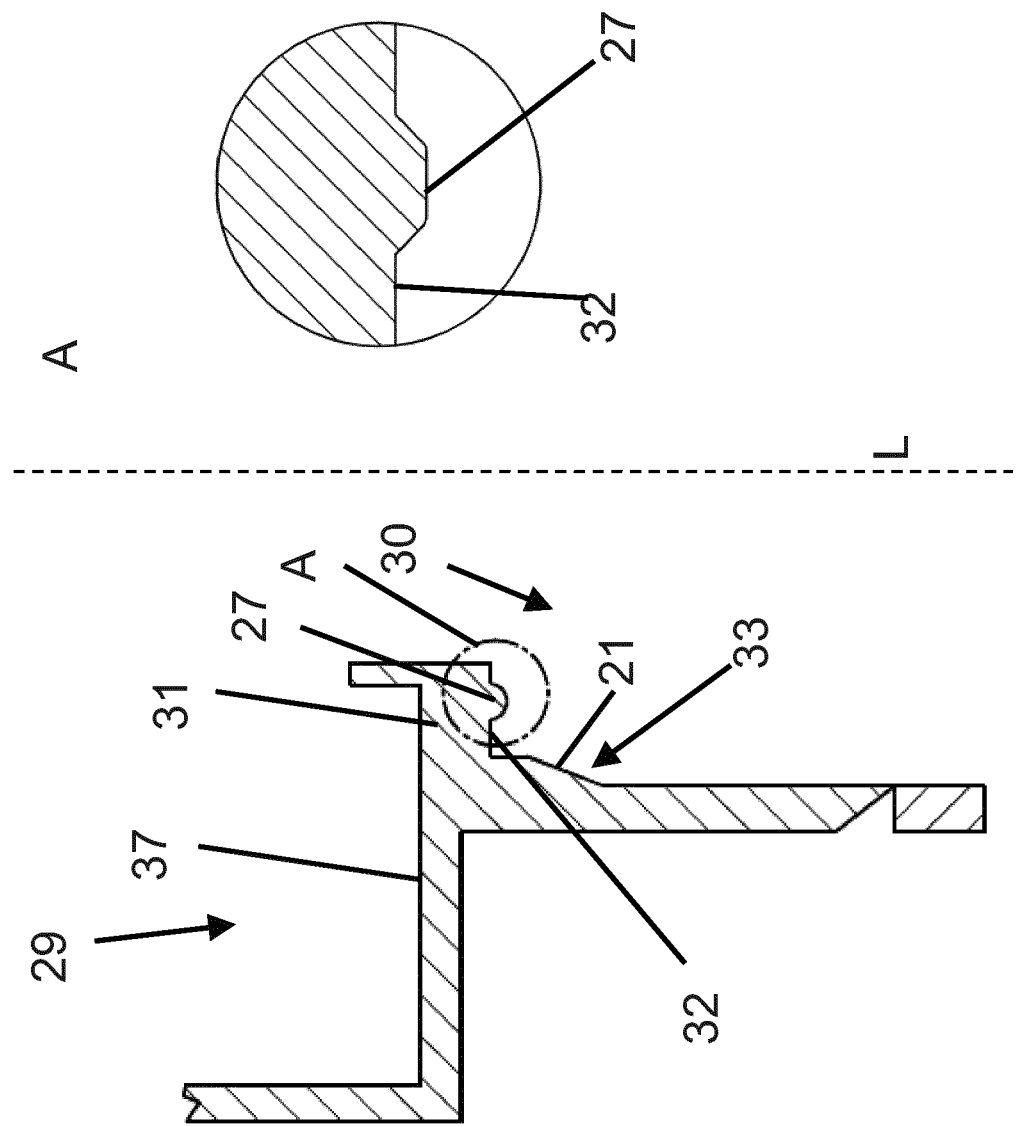
FIG. 3 is a schematic sectional depiction of a detail of the inventive device.
Figure 4:
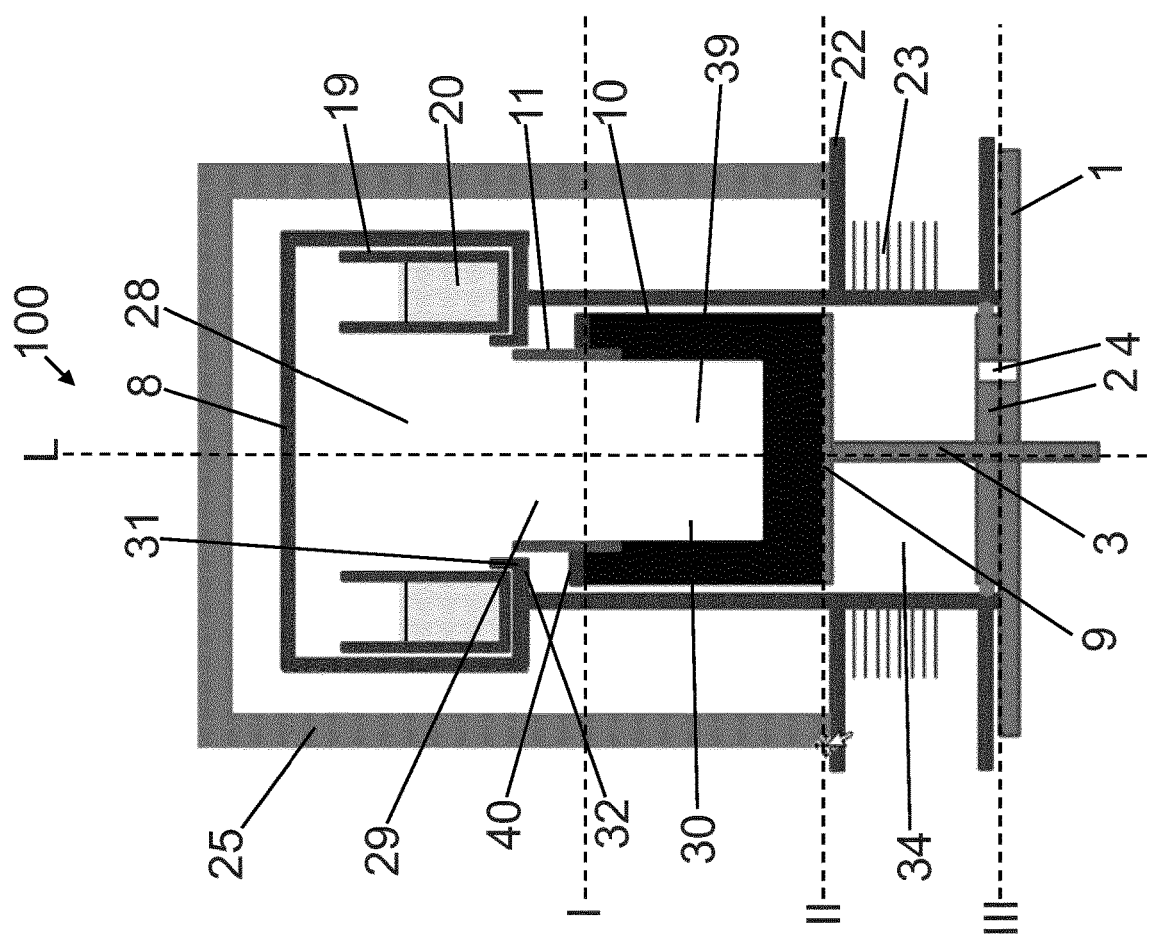
FIG. 4 is a schematic sectional depiction of an inventive device for producing purified magnesium, wherein the crucible is disposed in the first position.
Figure 5:
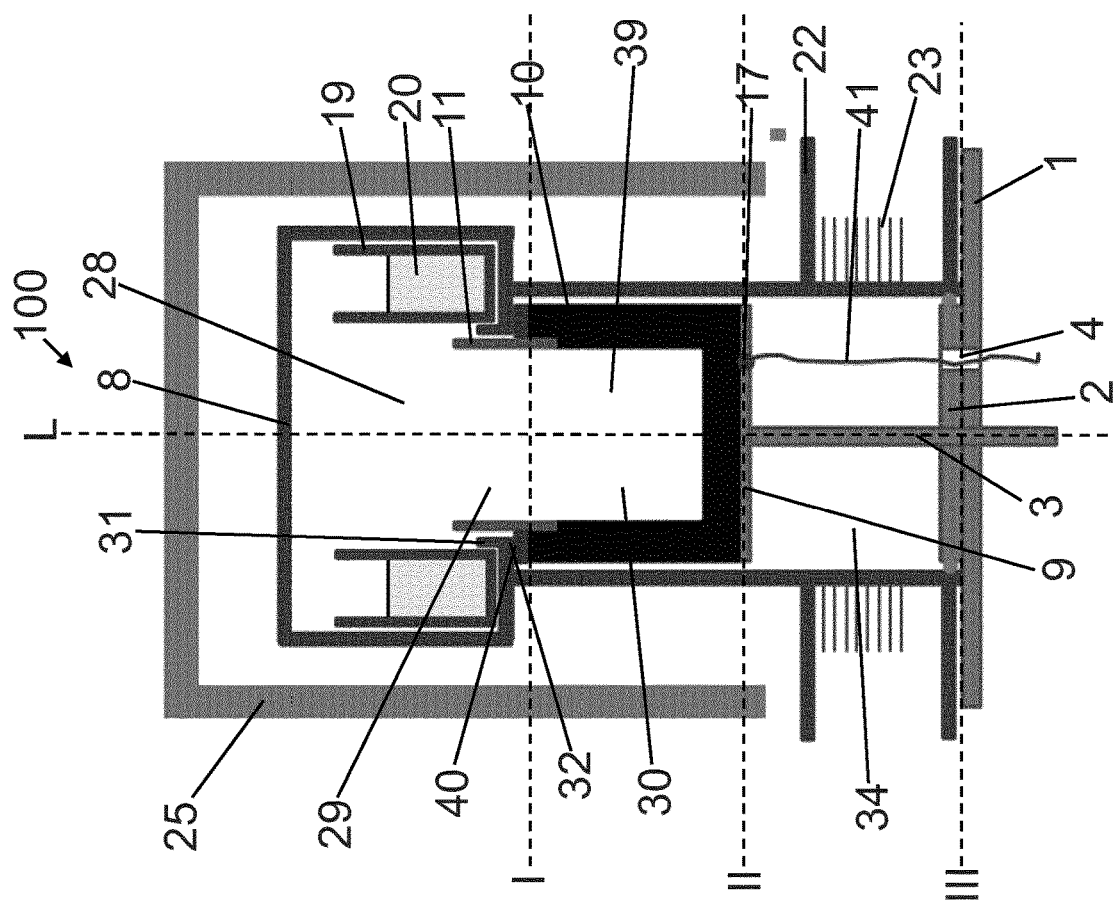
FIG. 5 is another schematic sectional depiction of the device illustrated in FIG. 4, wherein the crucible is in the second position.
Figure 6:
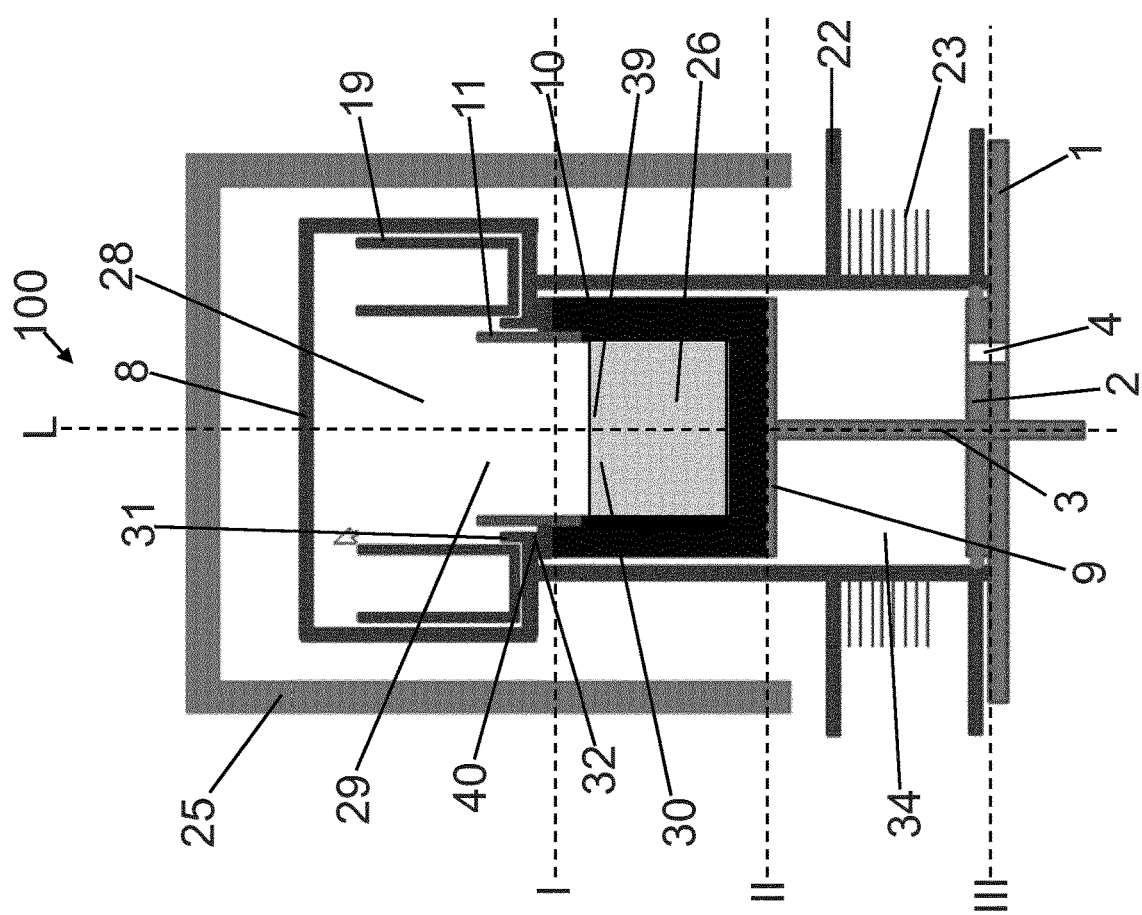
FIG. 6 is another schematic sectional depiction of the device illustrated in FIGS. 4 and 5 after the end of the distillation process.

The condensation region 30 is separated from the heating region 29 by a radially arranged circumferential projection 31 (see also detail view in FIG. 3). Arranged in the condensation region 30 is a pot-like crucible 10 having a crucible inner chamber 39 for receiving the condensed purified magnesium 26 formed during the distillation process. The crucible 10 has an edge 40 that delimits the crucible inner chamber 39. Arranged on the end face of the crucible 10 is a radially circumferential seal 12, in particular a flat seal.

In the configuration illustrated in FIG. 1, the edge 40 is in contact with a contact surface 32 of the projection 31 via the seal 12 (see also FIG. 3), wherein the edge 40, the seal 12, and the contact surface 32 embody an essentially sealing connection between the heating region 29 and the crucible inner chamber 39, so that the condensation region 30 disposed outside of the crucible 10 is essentially sealingly closed off from the heating region 29 and the crucible inner chamber 39. This can prevent magnesium that has vaporized during the distillation process from penetrating into the intermediate space between the crucible 10 and the wall of the condensation region 30 surrounding the crucible 10 and condensing there.

The crucible 10 furthermore has in the upper region an axial extension 11 (crucible extension) that extends the crucible 10 and projects further into the heating region 29. The axial extension 11 may be easily exchanged if contaminated or damaged by the vaporized magnesium disposed in the reactor inner chamber 28 and in addition provides an additional sealing apart from the essentially sealing connection between the edge 40 of the crucible, the seal 12, and the contact surface 32 of the projection 31.

The crucible 10 is borne on a ram 9 that in the additional region 34 of the reactor 8 is connected via a joint-like connecting point 38 to a pressure rod 3, wherein the pressure rod 3 is connected via a first connector 44 to a spring device 5, in particular a compound spring, and wherein the spring device 5 is connected via a second connector 45 to a drive device 6, in particular a hoist motor.

The drive device 6 is embodied to move the crucible 10 along the longitudinal axis L, and in the configuration illustrated in FIG. 1, in which the edge 40 of the crucible 10 is positioned against the projection 31, to transmit a force along the longitudinal axis L via the spring device 5, the pressure rod 3, and the ram 9 onto the crucible 10, so that the edge 40 of the crucible 10 is pressed against the seal 12 positioned against the contact surface 32, achieving an essentially sealing connection between the edge 40, the seal 12, and the contact surface 32. The joint-like connecting point 38 orients the crucible 10 axially to the reactor 8 for compensating any unintentional tilting of the crucible 10 on the joint-like connecting point 38.

The bottom element 2, which closes off the additional region 34 of the reactor 8 downward, has a centrally arranged through-hole 42 through which the pressure rod 3 is guided. In particular because the wall of the reactor 8 is extended downward to the bottom element 2 by the additional region 34, this leads to additional centering and stabilization of the guiding of the pressure rod 3 and thus to better sealing tightness of the connection between the edge 40 of the crucible, seal 12, and contact surface 32 of the projection 31.

The reactor 8 may in particular be opened by removing the bottom element 2 at its lower side. In this way the reactor 8 may be manually filled and cleaned. Thus containers 19, e.g. open metal containers, filled with magnesium 20 in particular in the heating region 29 may be placed. The optional circumferential edge of the bottom 37 leads to secure seating of the container 19 and prevents the container 19 from falling out.

In addition, the bottom element 2 has a vacuum connector 4 for connecting a vacuum pump 13. The outer region of the bottom element 2 has radially and/or axially arranged sealing rings 7 for sealing against the reactor 8. The through-hole 42 through which the pressure rod 3 is guided is also sealed off, e.g. by means of another sealing ring. Thus the reactor inner chamber 28 may be at least partially evacuated using the vacuum connector 4 arranged in the bottom element 2. A measuring line 41 of a first thermoelement 17 for measuring the crucible bottom temperature is also guided through the vacuum connector 4.

Fitted over the reactor is a heating device 25 having heating coils 43, in particular a hood-type furnace, such that it rests completely on a placement surface 22 of the reactor 8 at about the height of the ram.

A cooling device 23, e.g. a set of ribs, for thermal cooling of the reactor 8 is arranged outside of the additional region 34. The cooling may be accomplished, e.g. by convection or with forced air circulation (blowing with ventilator).

After loading, the reactor 8 is raised in particular above the basic structure of the system, lowered over the bottom element 2, and sealed by vacuum. The design is such that in this position there is a gap between seal 12 or edge 40 of the crucible 10 and the contact surface 32 of the projection 31 of the reactor 8 so that a vacuum may be created in the entire reactor inner chamber 28.

Figure 2:
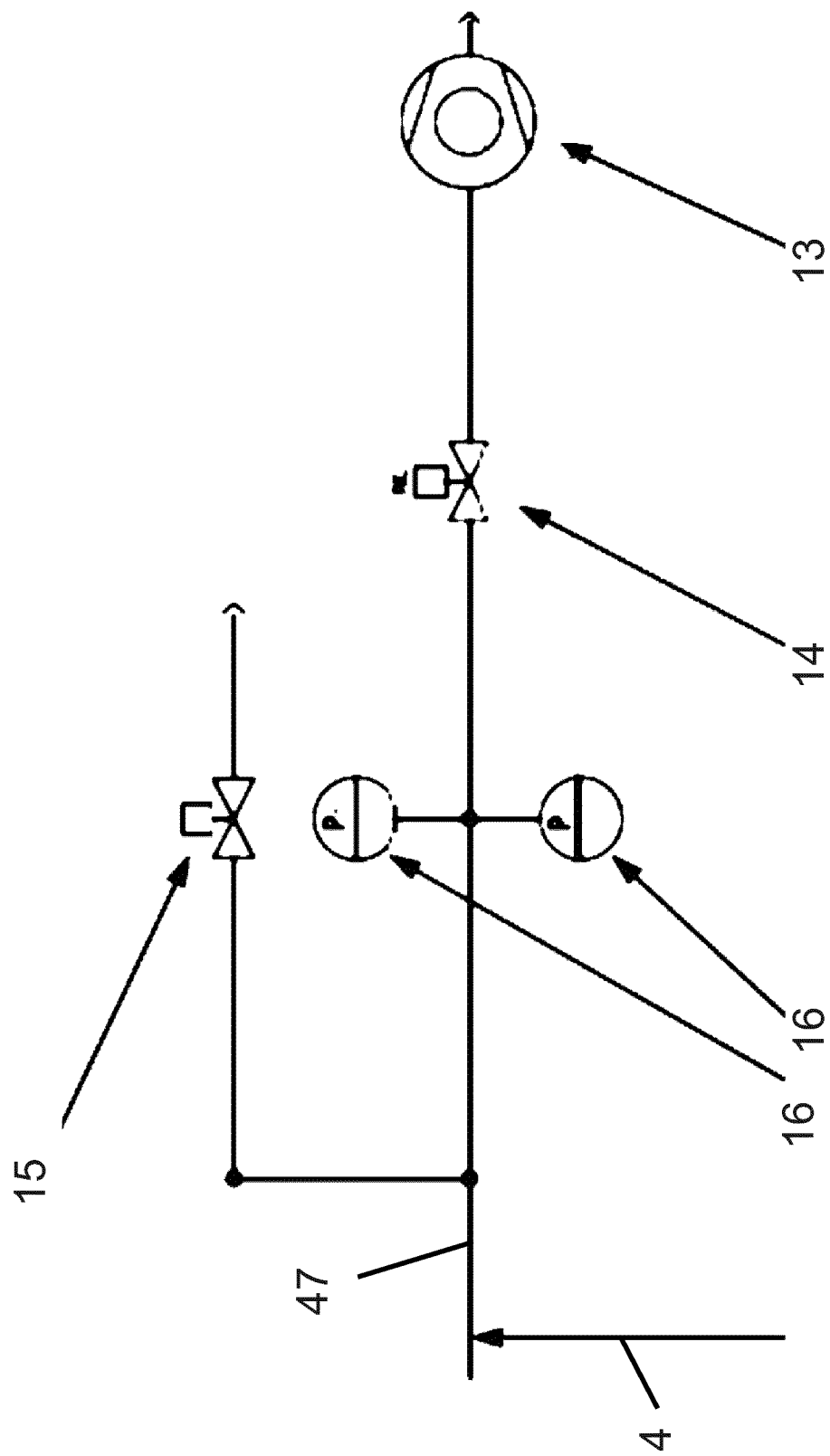
FIG. 2 is a schematic depiction of the vacuum line of the inventive device with additional components.

FIG. 2 is a schematic detail view of a vacuum line 47 that is connected to the vacuum connector 4 of the device 100 depicted in FIG. 1 for producing purified magnesium and is connected to a vacuum pump 13. A stop valve 14 for closing the vacuum line 47, an air relief valve 15 for fluidically connecting the vacuum line 47 to the surroundings, and a pressure sensor 16 for measuring the pressure in the vacuum line 47 are arranged between the vacuum connector 4 and the vacuum pump 13.

It is possible to draw conclusions about the pressure in the reactor inner chamber 28 during the method by the pressure sensor 16.

In this way the end of the distillation process may be detected by the pressure sensor 16. To this end, e.g. the pressure in the vacuum line 47 may be measured over the entire distillation period. The pressure in the reactor inner chamber 28, in particular in the space created by heating region 29 and crucible inner chamber 39, reaches its peak after about half of the time for the distillation process has elapsed, and drops slightly at the end. If all of the magnesium is vaporized and then condensed in the crucible 10, the pressure drops sharply to lower values, e.g. to approx. 35 mbar. This is the signal that the distillation has concluded. When the sharp drop in pressure is detected by the pressure sensor 16, in particular the heating device 25 may be automatically shut off.

FIG. 3 is a sectional schematic view of a part of the reactor wall of the inventive device 100 for producing purified magnesium. Depicted in the upper portion of FIG. 3 is a part of the annular outer segment of the heating chamber 29 of the reactor 8, which transitions to the condensation chamber 30 of the reactor 8 at the projection 31, which is radial relative to the longitudinal axis L. The projection has a likewise radially oriented contact surface 32 having an axially extended convex elevation 27. The detail A is an enlarged detail view of the segment A, marked in FIG. 3, of the contact surface 32 having the convex elevation 27. Also illustrated in FIG. 3 is a guide region 33 of the reactor wall having a conically embodied guide 21.

If the crucible 10 is brought into the condensation chamber 30 of the reactor 8, the crucible 10 is centered and guided by the guide 22 and its edge 40, possibly via the seal 12, comes into contact with the contact surface 32 of the projection 31 (see also FIG. 1). Due to the convex elevation 27, the surface pressure on the edge 40 of the crucible 10 or the flat seal 12 is increased, which improves the sealing effect.

In the following, an exemplary sequence of the inventive method for producing purified magnesium is described with reference to FIGS. 1 through 6.

First, in a heating phase, the reactor is evacuated by the vacuum pump 13. After the target pressure is attained (e.g. $1 \times 10^{-3}$ mbar), the heating device 25, e.g. the hood-type furnace, is turned on; the vacuum pump 13 continues to run. Due to the heating up process, the inner surface of the reactor 8 is cleaned by sorbate gases. The crucible 10 and the material of the seal 12 also outgas and are cleaned in this manner The heating up phase has concluded when the interim temperature in the heating region 29 of the reactor 8 has attained the target temperature (e.g. 350° C.), the crucible bottom temperature has attained its target value (e.g. >250° C.), and the target pressure has been attained (e.g. $1 \times 10^{-3}$ mbar). The reactor 8 is closed when all of the target variables have been attained. To this end, the drive device 6 presses the pressure rod 3 with the crucible 10 upward from the first position (see FIG. 4) into the second position (see FIG. 5).

The drive device 6 is turned off when the current consumption of the drive device 6 has reached its target value. The spring device 5 disposed thereover is now stressed and exerts a constant upward pressure onto the crucible 10. While the crucible 10 moves upward, it is guided using a conical guide 21 (see FIG. 3) and moved into a secure position. Due to the joint-like connecting point 38 it is assured that the seal 12 between crucible 10 and reactor 8 is loaded equally circumferentially. To further increase the specific surface pressure of the seal 12 locally, a convex elevation 27 is arranged on the contact surface 32.

Once the crucible 10 has been moved upward (and the reactor 8 has been closed, the vacuum line 47 to the vacuum pump 13 is closed via the stop valve 14 (see FIG. 2) and then the vacuum pump 13 is turned off (for the entire duration of the distillation). The reactor 8 is heated again, this time to the distillation temperature (e.g. 900° C.).

The temperature gradients are adjusted when the bottom temperature of the 10, measured by the first thermoelement 17, has reached the target temperature (e.g. 700° C.). At this point in time, the system has already reached the target temperature in the heating region 29 (e.g. 900° C.). The heating device 25, in particular the hood-type furnace, is raised and placed on three blocks pushed beneath it. Heat is lost because the heating device 25 is lifted and an equilibrium occurs. The height of the blocks was selected using experiments such that the crucible temperature may be maintained at, e.g., 700° C.

Once the vacuum pump 13 has been turned off and the reactor 8 has been heated further, the pressure in the reactor 8 climbs. Due to heating, the pressure within the apparatus increase (due to evaporated parts of the raw material). During the evaporation phase magnesium is still in the solid phase, and. no magnesium is evacuated. The increased temperature leads to an increase in pressure but far below atmospheric pressure.

This relationship may be observed on the pressure sensor 16 of the vacuum line 47. A magnesium vapor pressure occurs along the boiling point curve as a function of the temperature. In experiments, pressures of 70-90 mbar were measured in the vacuum line 47 at, e.g. 900° C.

According to vapor pressure curves, this should mean a pressure of approx. 110 mbar in the interior. The measured pressure remains practically unchanged over the entire distillation period.

The magnesium distillation is practically a stationary condition at which magnesium 20 transitions to the vapor phase according to its boiling point curve and purified magnesium 26 condenses on the walls of the crucible 10 and is captured. Because of the condensation, the gaseous magnesium is taken out of equilibrium so that new magnesium can vaporize.

In a reactor having a capacity of 3 kg starting magnesium, around 200±50 grams of magnesium per hour deposits. Due to the condensation, condensation heat is released and over time the crucible bottom temperature rises slightly. As a rule maximum temperatures up to approx. 735° C. were observed. After the maximum, the temperature drops again slightly and the end of the distillation is close at hand. At the end of distillation, when all of the magnesium has been evaporated and has condensed again, the temperature of the crucible 10 is again approx. 700° C.

The end of distillation (see FIG. 6) may be detected, e.g., using the temperature increase in the heating region 29 of the reactor 8. Due to a lack of magnesium (and thus also evaporation energy that is no longer required), the temperature increases by approx. +6 to +10° C., measured on the second thermoelement 24 (see FIG. 1).

Alternatively, the end of distillation may also be detected by measuring the drop in pressure. The pressure in the vacuum line 47 is measured over the entire distillation period. After the distillation process is about half complete, the pressure reaches its peak and drops slightly until the end of distillation. If all of the magnesium 20 evaporates and is condensed in the crucible 10, the pressure drops sharply to, e.g., approx. 35 mbar. This is a signal that the distillation has concluded and the system may thus be shut down automatically.

Once the distillation has concluded, high-purity magnesium is disposed in the crucible 10 as condensate 26.

| Reference list | |
|---|---|
| 1 | Base |
| 2 | Bottom element |
| 3 | Pressure rod |
| 4 | Vacuum connector |
| 5 | Spring device, especially compound spring |
| 6 | Drive device, especially hoist motor |
| 7 | Sealing ring, especially O-ring |
| 8 | Reactor |
| 9 | Ram |
| 10 | Crucible |
| 11 | Axial extension |
| 12 | Seal, especially flat seal |
| 13 | Vacuum pump |
| 14 | Stop valve |
| 15 | Air relief valve |
| 16 | Pressure sensor |
| 17 | First thermal element |
| 18 | Ribs |
| 19 | Container |
| 20 | Magnesium |
| 21 | Guide |
| 22 | Placement surface |
| 23 | Cooling device |
| 24 | Second thermoelement |
| 25 | Heating device, especially hood-type furnace |
| 26 | Purified magnesium |
| 27 | Convex elevation |
| 28 | Reactor inner chamber |
| 29 | Heating region |
| 30 | Condensation region |
| 31 | Projection |
| 32 | Contact surface |
| 33 | Guide region |
| 34 | Additional region |
| 35 | Lateral surface |
| 36 | Cover |
| 37 | Bottom |
| 38 | Joint-like connecting point |
| 39 | Crucible inner chamber |
| 40 | Edge |
| 41 | Measuring line |
| 42 | Through-hole |
| 43 | Heating coil |
| 44 | First connector |
| 45 | Second connector |
| 46 | Opening |
| 47 | Vacuum line |
| 100 | Device for producing purified magnesium |
| I | First sectional line |
| II | Second sectional line |
| III | Third sectional line |
| L | Longitudinal axis |

The invention claimed is:

1. A device for producing purified magnesium, comprising: a vacuum distillation reactor defining a reactor inner chamber having a heating region for heating magnesium and a condensation region below the reactor inner chamber, the heating region having an annular bottom with an opening to the condensation region, a container configured to contain magnesium arranged on the annular bottom in the reactor inner chamber, and a crucible configured to be received in the condensation region, the crucible forming a crucible inner chamber arranged to receive condensed and purified magnesium through the opening, a circumferential projection extending radially inward from the annular bottom around the opening, the circumferential projection defining a contact surface configured to compress a seal between itself and an upper circumferential edge of the crucible when the crucible is forced upward within the condensation region.

2. The device of claim 1, comprising a conical guide in the condensation region configured to center the crucible.

3. The device of claim 1, wherein the crucible is movable upward between a first position and a second position, wherein when the crucible is in the first position the inner chamber of the crucible is in fluidic contact with the reactor inner chamber, and wherein when the crucible is in the second position the edge of the crucible compresses the seal against the contact surface of the projection so that the heating region is in fluidic contact with the crucible inner chamber and the condensation region outside of the crucible is sealed from the heating region and the crucible inner chamber.

4. The device of claim 3, further comprising a drive device with a hoist motor configured to move the crucible along between the first position and the second position, wherein, when the crucible is in the second position, the drive device transmits an upward force onto the crucible so that the crucible is pressed against the seal and the projection.

5. The device of claim 4, further comprising a pressure rod for transmitting the force from the drive device to the crucible, and a bottom element that closes off the reactor inner chamber, wherein the bottom element comprises a through-opening that is configured for guiding the pressure rod through the through-opening.

6. The device of claim 1, further comprising a vacuum connector for connecting a vacuum pump to produce vacuum in the reactor inner chamber and a first thermoelement arranged on the crucible wherein, a measuring line is connected to the first thermoelement, and the measuring line is guided through the vacuum connector.

7. The device of claim 1, further comprising a cooling device for arranged to remove heat from the crucible.

8. The device of claim 1, wherein the contact surface facing the seal is made of graphite.

9. The device of claim 8, wherein the projection has a convex elevation configured to be positioned against the seal when the seal is arranged between the edge of the crucible and the contact surface of the projection.

10. The device of claim 1, further comprising a hood furnace arranged outside of the reactor.

11. The device of claim 1, wherein the crucible comprises an axial extension that extends the crucible inner chamber axially beyond the edge of the crucible.

12. A method for producing purified, especially high-purity, magnesium using a device for producing purified magnesium according to claim 1, comprising
  arranging the crucible in the reactor inner chamber,
  providing magnesium in the container,
  bringing the edge of the crucible into sealed contact with the seal and contact surface of the projection,
  producing a vacuum at least in the heating region of the reactor inner chamber, heating the heating region of the reactor inner chamber so that magnesium is vaporized in the heating region and vaporized purified magnesium is condensed in the crucible.

13. The method of claim 12, wherein container is a transportable container in the heating region of the reactor inner chamber.

14. The method of claim 12, comprising detecting pressure in the vacuum line and terminating the heating when a threshold pressure is detected.

15. The method of claim 14, wherein the threshold pressure is 35 mbar.

16. The device of claim 1, wherein the heating region has a larger diameter than the condensation region and the crucible.

* * * * *